(12) United States Patent
Andreen et al.

(10) Patent No.: US 6,270,115 B1
(45) Date of Patent: Aug. 7, 2001

(54) AIR BAG SUPPRESSION SYSTEM

(75) Inventors: Margaret M. Andreen, Fenton; William Joseph Barnes, Waterford, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/404,482

(22) Filed: Sep. 23, 1999

(51) Int. Cl.$^7$ .......................... B60R 21/01; B60R 21/32
(52) U.S. Cl. ............................. 280/735; 180/282; 701/45
(58) Field of Search ..................... 280/735; 180/282; 701/45; 340/438

(56) References Cited

U.S. PATENT DOCUMENTS

| 5,074,583 | * | 12/1991 | Fujita et al. ........................ 280/735 |
| 5,413,378 | * | 5/1995 | Steffens, Jr. et al. ............... 280/735 |
| 5,613,702 | * | 3/1997 | Goetz .................................. 280/735 |
| 5,626,359 |   | 5/1997 | Steffens, Jr. et al. . |
| 5,803,491 |   | 9/1998 | Barnes et al. ........................ 280/735 |
| 5,821,633 |   | 10/1998 | Burke et al. . |
| 5,967,549 | * | 10/1999 | Allen et al. ......................... 280/735 |

FOREIGN PATENT DOCUMENTS 0829398   3/1998 (EP) .
98 36950   8/1998 (WO) .

OTHER PUBLICATIONS

Hardware System And Logic For A tunable SIR System, Research Disclosure, Industrial Opportunities Ltd. Havant, GB, No. 357, 1994, p. 50 XP-425363, the whole document.

* cited by examiner

Primary Examiner—Peter C. English
(74) Attorney, Agent, or Firm—Kathryn A. Marra

(57) ABSTRACT

A dual stage air bag suppression system based upon seat position. A deceleration sensor senses the deceleration of the vehicle during a crash/collision. If the deceleration exceeds a first threshold value, and the seat is rearward of a predetermined value, then the SIR Controller initiates a first/low stage inflation. If the deceleration exceeds a second higher threshold value, and the seat is rearward of a predetermined value, then the SIR Controller initiates both first/low and second/high stages of inflation. If the seat is positioned at a point forward of a predetermined position, then the SIR Controller initiates the first/low stage inflation only when the deceleration exceeds the first/lower or second/higher threshold value and suppresses deployment of the second stage. Thus the SIR Controller initiates the inflation stages not only based on the severity of the collision or deceleration, but also based on the position of the vehicle seat.

12 Claims, 4 Drawing Sheets

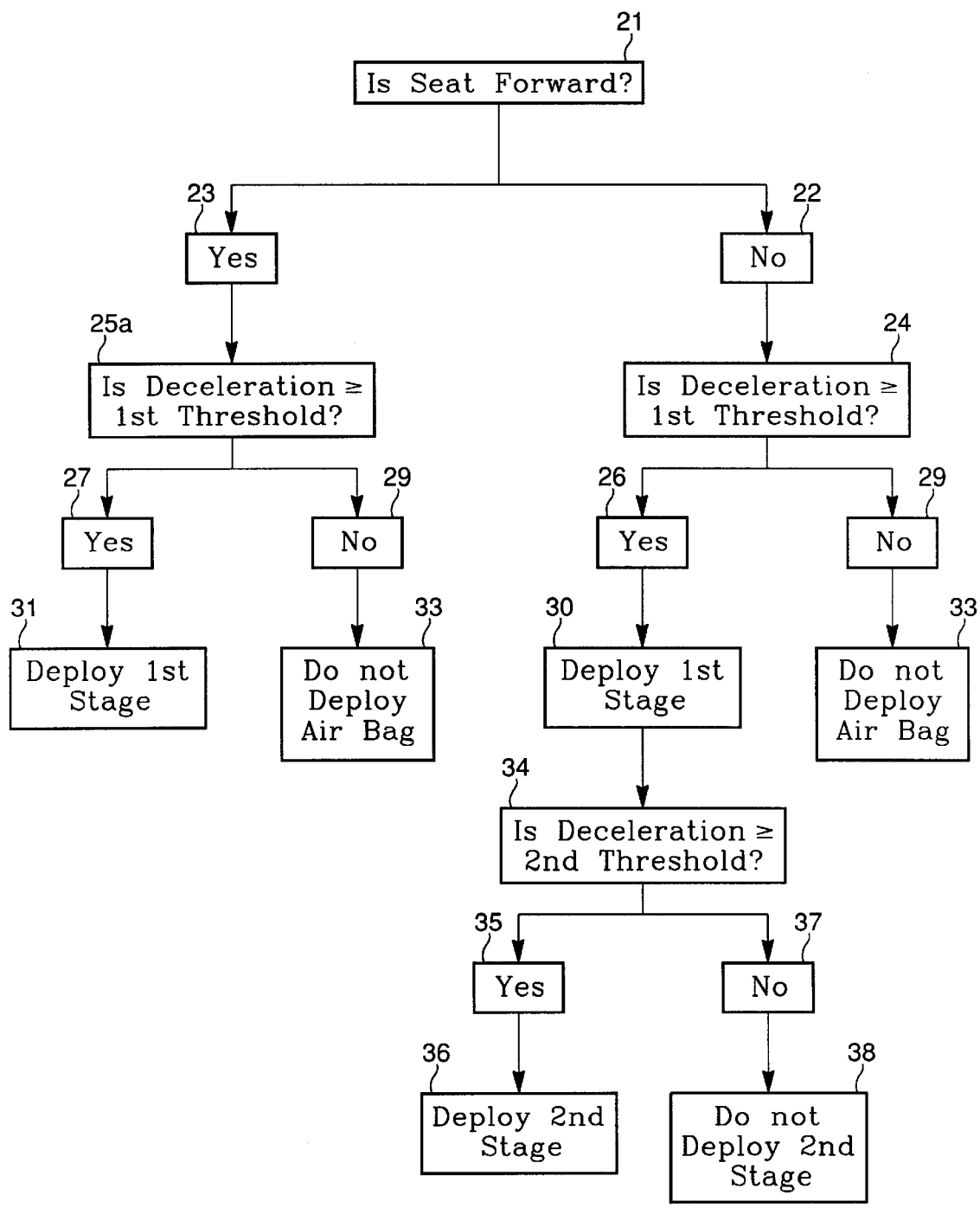

AIR BAG SUPPRESSION SYSTEM

BACKGROUND OF THE INVENTION

1. Field of the Invention

This invention relates to an air bag suppression system and more particularly to a dual stage air bag system dependent on seat position.

2. Description of the Related Art

It is well known in the art to provide a supplemental inflatable restraint (SIR) system for the protection of vehicle occupants. A typical SIR system includes a housing, an air bag normally stored in the housing, and an inflator for discharging gas to inflate the air bag. Conventional systems activate the inflator in response to a predetermined amount of deceleration.

Some systems incorporate a dual stage inflator system. These systems control the inflation of the air bags in response to the severity of a collision. A first or low stage inflation having a low volume is activated in a collision with lower deceleration. A second or high stage inflation having an increased volume is additionally activated in collisions with higher decelerations. Typically a deceleration sensor senses the deceleration of the vehicle during a collision. The first inflation stage is triggered in response to the output of the deceleration sensor when the detected deceleration is equal to or greater than a first threshold value. The second inflation stage is triggered in response to the output of the deceleration sensor when the detected deceleration is equal to or greater than a second threshold value higher than the first threshold value.

U.S. Pat. No. 5,803,491 discloses an air bag disabling system for completely disabling the deployment of the air bag when the seat is in certain forward positions and is hereby incorporated herein by reference. When this air bag system is completely disabled, the air bag system is disabled and does not deploy.

The dual stage air bag provides certain deployment options over the single stage air bag inflation systems. It may be advantageous to control the deployment of the first and second stages, not only upon vehicle deceleration, but also based upon the seat position.

SUMMARY OF THE INVENTION

The present invention is directed to a dual stage air bag suppression system based upon seat position. A deceleration sensor senses the deceleration of the vehicle during a collision. If the deceleration exceeds a first threshold value, and the seat is rearward of a predetermined value, then the SIR controller initiates a first/low stage inflation. If the deceleration exceeds a second higher threshold value, and the seat is rearward of a predetermined value, then the SIR Controller initiates both first/low and second/high stage inflation. If the seat is positioned at a point forward of a predetermined position, then the SIR controller initiates only the first/low stage inflation and suppresses initiation of the second/high stage inflation. Thus the SIR Controller initiates the inflation stages not only based on the severity of the collision or deceleration, but also based on the position of the vehicle seat.

BRIEF DESCRIPTION OF THE DRAWINGS

FIG. 4 depicts a logic flow chart illustrating the logic sequence for controlling inflation according to an alternate preferred embodiment of the present invention.

DESCRIPTION OF THE PREFERRED EMBODIMENT

Figure 1:
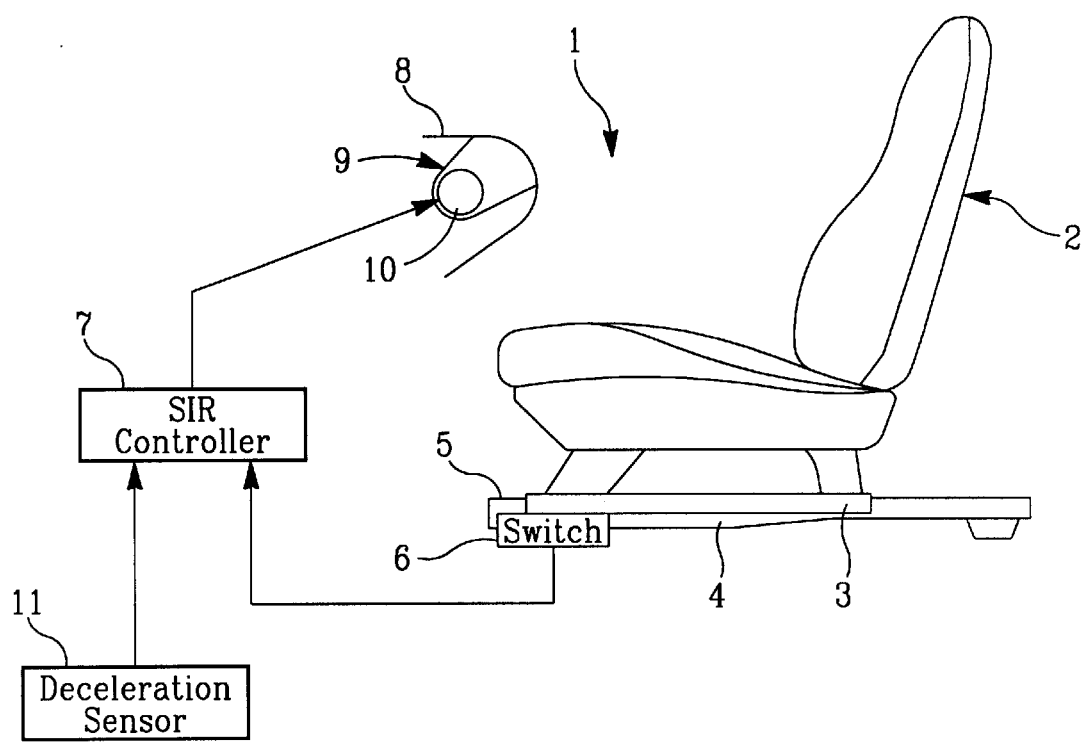
FIG. 1 depicts the air bag suppression system according to the present invention.

FIG. 1 depicts the airbag suppression system generally indicated as 1. A seat 2 is mounted on a base 3 that is in turn moveably mounted on a seat track 4 which is in turn fixed to the vehicles floor in a conventional manner. The seat 2 is moveable forward and rearward by sliding the base 3 along track 4. The seat 2 may be slid forward manually or by power seat controls as is known in the art. Thus an occupant can control the position of seat 2 along track 4. The seat 2 may be slid to a forward most position indicated by reference numeral 5. A seat position detector in the form of a switch 6 is provided to indicate the position of the seat 2 relative to the track 4 and consequently the relative position of the seat 2 with respect to the vehicle. When the seat 2 is positioned at the forward most position 5, or within a predetermined distance from the forward most position 5, the switch 6 sends a signal to the SIR controller 7 indicating that the seat 2 is in a forward position. The forward most position 5, and the predetermined distance to the forward most position 5 is dependant on the specific geometry of the vehicle and whether the seat 2 is located on the driver side or passenger side of the vehicle. With some vehicle configurations, because of the steering wheel, the predetermined distance may be larger for the driver's side seat as the distance between the driver and the steering wheel will be less than the distance between a passenger and the passenger side instrument panel 8.

FIG. 1 depicts a passenger side instrument panel 8 having a SIR system 9 mounted therein. The SIR system 9 includes an inflatable air bag (not shown) which is inflated by discharging gas from at least two initiators or squibs within an inflator 10 for protecting the occupant during a vehicle crash or collision. The squibs are activated upon receiving a signal from the SIR controller 7. Whether one or both of the squibs are initiated depends upon the position of the seat 2 and the vehicle's deceleration. Of course, rather than employing two squibs within a single inflator, two separate inflators may be used. However, the present invention contemplates the use of two squibs within a single inflator. While a dual stage inflator is embodied, the invention also contemplates the use of a multi-stage inflator that has numerous stages of inflation available that may be infinitely variable.

A deceleration sensor 11 is conventionally mounted in the vehicle and sends a signal representative of the vehicle's deceleration during a crash or collision to the SIR controller 7. Depending on the value of the deceleration signal, and the position of the seat 2, the SIR controller 7 will initiate one or both of the squibs. Generally, the SIR Controller 7 will initiate a first stage deployment, or a first one of the squibs, if the vehicle's deceleration is moderate and will initiate an additional second stage, or the second squib, if the vehicle deceleration is severe. However, if the seat 2 is in a forward position, then the SIR Controller 7 will only deploy the first stage, or one of the squibs and suppress initiation of the second squib, even if the deceleration is severe. Moreover, with certain vehicle configurations experiencing a moderate crash or collision event, single stage deployment of the air bag may not be desired. Therefore, in a first embodiment of the present invention, when the seat 2 is in the forward position 5, first stage deployment of the airbag is permitted only in a severe crash/collision event.

The deceleration sensor sends a signal to the SIR Controller 7 indicative of the vehicle deceleration. If the deceleration signal is equal to or exceeds a first threshold value, then a moderate crash/collision is detected and the SIR Controller 7 will initiate the squibs accordingly. If the deceleration signal is equal to or greater than a second higher value, then a severe crash/collision is sensed. Having two threshold values, a first lower value and a second higher threshold value, enables the deceleration sensor to indicate three crash conditions. A first crash condition known as a low severity or non-crash event is sensed when the deceleration sensor produces a signal less than the first threshold value. A second crash condition of moderate severity exists when the deceleration sensor 11 produces a signal between the first and second threshold values. A third severe crash condition exists when the deceleration sensor 11 produces a signal equal to or exceeding the second threshold value. The threshold values are vehicle dependent. Different threshold values are set for front wheel drive vehicles, larger vehicles, and vehicles of different body styles.

Figure 2:
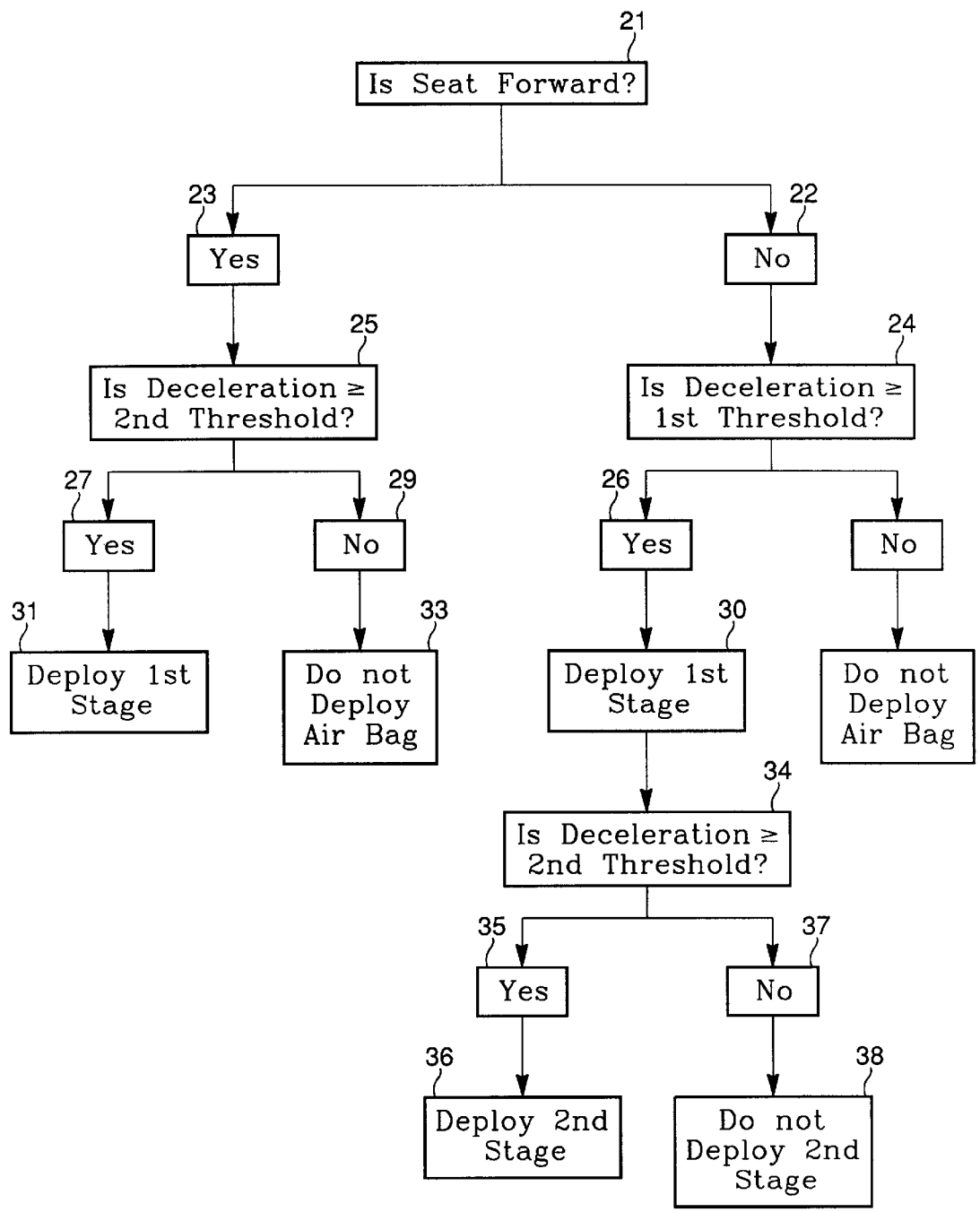
FIG. 2 depicts a logic flow chart illustrating the logic sequence for controlling inflation.

FIG. 2 depicts the SIR Controller's 7 algorithm to decide whether to initiate one or both of the squibs, or simply prohibit deployment of either squib according to the first embodiment. The SIR Controller 7 receives a signal from switch 6 indicative of the position of the seat 2 (21). If the seat 2 is located within a predetermined distance of the forward most position 5 (23), then the SIR Controller 7 will determine if the deceleration signal equals or exceeds the second higher threshold value (25). If the deceleration signal is less than the second threshold value (29) then the SIR Controller 7 will not initiate either squib, and the air bag will not inflate (33). If the deceleration signal equals or exceeds the second threshold value (27), thereby sensing a severe crash/collision, then the SIR Controller 7 will initiate the first stage, or one of the squibs for a single stage inflation (31). The SIR Controller 7 will not permit dual stage deployment where both of the squibs are initiated when the seat 2 is positioned in the forward most position 5 or a predetermined distance thereto.

If, however, the seat 2 is located rearward (22), then the SIR Controller 7 will permit both single and dual stage deployment of the air bag depending on the vehicle's deceleration. If the seat 2 is not positioned forward (22), the SIR Controller 7 determines the value of the deceleration signal (24). If the deceleration signal equals or exceeds the first threshold value (26), then the first squib is initiated (30). Then the SIR Controller 7 determines if the deceleration signal equals or exceeds the second threshold value (34). If the deceleration signal equals or exceeds the second threshold value (35), then the SIR Controller 7 initiates the second squib for dual stage deployment (36). If the deceleration signal is less than the second threshold value (37), then the SIR Controller 7 will not initiate the second squib (38). It is preferred that the SIR Controller 7 first determines whether to initiate the first squib for the first stage deployment, prior to determining whether to initiate the second squib for dual stage deployment. It is preferable to have a delay between the initiation of the first and second squibs. However, should the deceleration signal exceed the second threshold value, both squibs could be initiated simultaneously.

Therefore, the position of the seat 2 discriminates, or alters, the determination of whether to initiate the squibs based on crash severity. In simpler terms, the SIR controller 7 executes two different algorithms depending on seat 2 position. When the seat 2 is rearward, the SIR controller 7 executes an algorithm that allows single and two-stage air bag deployment dependent purely on vehicle deceleration. When the seat 2 is positioned forwardly, the SIR Controller 7 executes a control algorithm that prohibits second stage deployment of the air bag and allows first stage deployment only when a severe crash/collision is detected.

As previously discussed, switch 6 sends a signal to the SIR Controller 7 when the seat 2 in a forward most position 5 or within a predetermined distance to the forward most position 5. The switch 6 may be of any suitable construction capable of sensing when the seat 2 is in the forward position. Preferably the switch 6 is moveable to a triggered position when the seat is forward to provide an input signal to the SIR Controller 7 indicating that air bag inflation should be suppressed. That is, when the seat 2 is in the forward most position 5, or a predetermined distance thereto, second stage deployment of the air bag is suppressed, and first stage deployment occurs only in a severe crash/collision event.

Switch 6 may be a contact type limit switch in which the SIR controller 7 is signaled to suppress the air bag deployment when the switch 6 is closed and contact is made. In this case, the switch 6 may include a contact portion, which moves with the base 3 to make contact with another portion of the switch 6. The switch 6 may also be a limit/toggle switch including a lever moveable between a first and second position by a projection carried on the base 3 as the base 3 moves forward and rearward on the track 4. The switch 6 may also comprise a sensor activated by voltage variation as determined as the base 3 moves along the track 4. It is to be understood that the many different types of switch devices may be employed to signal the SIR controller 7. So long as the position of the seat is determined, and more particularly, the position of the seat 2 with respect to the forward most position 5, is detected and a signal is sent to the SIR Controller 7 indicative of the seat position, the SIR Controller 7 will suppress deployment of the air bag when the seat is in the forward most position 5 or within a predetermined distance thereto.

Figure 3:
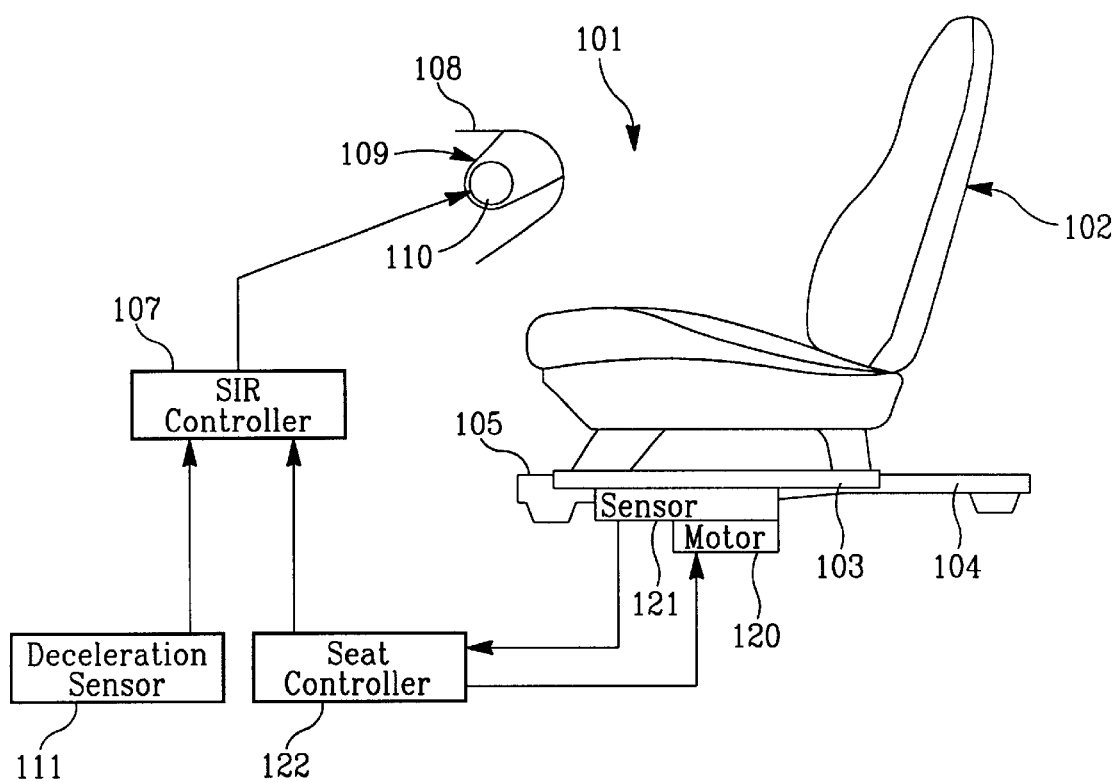
FIG. 3 is an air bag suppression system according to an alternate embodiment of the present invention.

FIG. 3 depicts an alternate embodiment of the present invention as generally indicated as 101. The seat 102 is mounted on a base 103 moveable on the seat track 104, which in turn is fixed to the vehicle floor. The seat 102 is moveable forwardly and rearwardly by sliding base 103 along the track 104 powered or assisted by at least one motor 120. Preferably the suppression system 101 includes a seat controller 122 that continuously monitors the position of the seat 102. The seat controller 122 is preferably a seat module of known construction, which remembers the position of the seat 102 to a preprogrammed position, based on the occupant's preference. The seat controller 122 could alternatively be a part of a known type of dash integration module. The seat 102 includes a predetermined forward seat position 105 in which the seat 102 is moved a predetermined amount forward on the track 104, preferably being in the full forward position 105 or within a predetermined distance thereto.

The SIR system 109 includes an inflatable air bag (not shown) which is inflated by discharging gas from at least two two squibs, within an inflator 110, for protecting the occupant during a vehicle crash or collision. The squibs are activated upon receiving a signal from the SIR controller 107. Whether one, both or none of the squibs are initiated depends upon the position of the seat 102 and the vehicle's deceleration.

A deceleration sensor 111, or acceleration sensor, is conventionally mounted in the vehicle and sends a signal representative of the vehicle's deceleration during a crash or collision to the SIR controller 107. Preferably two deceleration sensors 111 are employed, one sensor located within the forward most compartment of the vehicle such as in the front portion of the vehicle's frame, and a second sensor located within the occupant compartment of the vehicle. Depending on the value of the deceleration signal, and the position of the seat 2, the SIR controller 107 will initiate one or both of the squibs. Generally, the SIR Controller 107 will initiate a first stage deployment, or a first one of the squibs, if the vehicle's deceleration is moderate and will initiate an additional second stage, or the second squib, if the vehicle deceleration is severe. However, if the seat 102 is in a forward position, then the SIR Controller 107 will only deploy the first stage, or one of the squibs, even if the deceleration is severe. When the seat 102 is in the forward most position 105, only a first stage deployment of the airbag is permitted in a severe crash/collision event for certain vehicle configurations.

In the motor assisted/powered seat arrangement of the alternated embodiment, the seat 102 includes a seat position detector in the form of a seat position sensor 121, which is continuously monitored by the seat controller 122. The seat controller 122 sends the seat position signal to the SIR controller 107 whenever the seat position changes. The SIR controller 107 is programmed to compare the position of the seat 102 from the seat position signal to a predetermined threshold value in the software algorithm. The seat controller 122 could also perform this check. If the seat is at or near the forward most position 105, then the SIR controller 107 is signaled accordingly and the SIR controller 107 will suppress deployment of the air bag. If the seat is in a rearward position, then the SIR controller will not suppress deployment of the air bag and the air bag will deploy purely in response to the vehicle's deceleration. The logic algorithm programmed into the SIR controller 107 is the same for the embodiment of FIG. 1 and is depicted by FIG. 2 and alternately FIG. 4.

It is to be noted that the sensor 121 may be of any suitable construction for sensing the position of the seat 102 along the track 104. The sensor 121 preferably measures a voltage level based on the seat 102 position. When the seat controller 122 reads a voltage less than a predetermined threshold value being indicative of the seat 102 being at or within a predetermined distance to the forward most position 105, then the seat controller 122 signals the SIR controller 107 to suppress air bag deployment. When the sensor 121 reads a voltage level greater than the predetermined threshold value and being indicative of the seat 102 being position rearwardly, then the controller 122 sends a signal to the SIR controller 107 to allow two stage deployment in response to vehicle deceleration.

FIGS. 1 & 3 depict a seat 2, 102 on a passenger side of the vehicle. However, the present air bag suppression system may be equally adapted to a driver's side of the vehicle. When employing the present air bag suppression system 1 in the driver's side of the vehicle, detection of the seat 2 position may be calibrated to take into account the steering wheel and steering column. Specifically, the predetermined distance from the forward most position 5 activating the suppression algorithm must be increased for certain vehicle configurations. The driver is inherently placed much closer to the steering wheel, from which the air bag is deployed, than a corresponding passenger to the instrument panel 8, 108 for the same seat position. Therefore, the switch 6, or seat controller 122 may account for the driver side embodiment. However, this may be unnecessary for many vehicle configurations.

FIG. 4 depicts a logic flow chart illustrating the logic sequence for controlling inflation according to an alternate preferred embodiment of the present invention. When the seat 2 is in a rearward position, the logic algorithm is the same as that of FIG. 2. However, when the seat 2 is in the forward most position, the first stage is initiated when the deceleration signal exceeds the first/low threshold (value (25a). If the deceleration signal exceeds the second/high threshold value, again only the first stage is initiated. As in the embodiment of FIG. 1, there is no provision for initiating the second stage inflation when the seat 2 is in the forward most position. Therefore, second stage deployment of the air bag is suppressed when the seat 2 is in a forward most position. Therefore, the difference between the embodiment of FIGS. 2 & 4 resides in whether the first stage is deployed in a moderate crash/collision event. In the preferred embodiment of FIG. 4, the first stage is initiated in a moderate crash event. In the Embodiment of FIG. 2, the first stage is initiated only in a severe crash event.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims. For example, while the present invention utilizes a deceleration sensor, or multiple deceleration sensors, to sense or measure the severity of a collision event, it is contemplated that technological advances that can measure the severity of a collision to selectively deploy the dual stages of the air bag will fall within the scope of the present invention.

What is claimed is:

1. An air bag suppression system for a vehicle having a seat movable forward and rearward within said vehicle and having a predetermined seat position within said vehicle, said system comprising:

a seat position detector generating a position signal representative of a position of said seat relative to said vehicle;

a supplemental inflatable restraint system having an air bag inflatable in at least a first low inflation stage and a second high inflation stage;

a collision sensor generating a collision signal representative of at least a low severity and a high severity collision event of said vehicle;

a controller connected to said collision sensor and said seat position detector and receiving said collision signal and said position signal, said controller being connected to said supplemental restraint system and sending a signal to initiate either of said first low and said second high inflation stages, wherein said controller selectively initiates at least one of said first and second inflation stages in response to said collision signal when said seat position signal indicates said seat is positioned rearward of said predetermined position, and when said seat position signal indicates said seat is positioned forward of said predetermined position said controller prohibits initiation of said high inflation stage and selectively initiates said low inflation stage in response to said collision signal.

2. The air bag suppression system according to claim 1, wherein said collision sensor comprises a deceleration sensor generating a deceleration signal representative of a deceleration of said vehicle.

3. The air bag suppression system according to claim 2, wherein when said seat is positioned rearward of said predetermined position said controller initiates said first low inflation stage only when said deceleration signal is not less than a first threshold value and initiates said second high inflation stage only when said deceleration signal is not less than a second threshold value higher than said first threshold value, and when said seat is positioned forward of said predetermined position said controller initiates said first low inflation stage only when said deceleration signal is not less than said second threshold value and prohibits inflation of said second high inflation stage.

4. The air bag suppression system according to claim 2, wherein when said seat is positioned rearward of said predetermined position said controller initiates said first low inflation stage only when said deceleration signal is not less than a first threshold value and initiates said second high inflation stage only when said deceleration signal is not less than a second threshold value higher than said first threshold value, and when said seat is positioned forward of said predetermined position said controller initiates said first low inflation stage only when said deceleration signal is not less than said first threshold value and prohibits inflation of said second high inflation stage.

5. The air bag suppression system according to claim 2, wherein said seat position detector includes a switch movable to a triggered position when said seat is positioned forward of said predetermined position and sends a signal to said controller indicating said seat is positioned forward of said predetermined position.

6. The air bag suppression system according to claim 1, wherein said seat position detector includes a sensor sensing said position of said seat relative to said predetermined position and said sensor sends a signal to said controller indicating said seat position.

7. A method of controlling a dual stage air bag in a vehicle having a first low inflation stage and a second higher inflation stage, said method comprising the steps of:

sensing a position of a seat within said vehicle;

sensing a severity of a collision event of said vehicle;

controlling a deployment of said dual stage air bag dependent on said position of said seat and said severity of said vehicle, wherein when said position of said seat is positioned rearward of a predetermined position said controller initiates said first low inflation stage only when said severity of said collision event equals or exceeds a first threshold value indicative of a moderate collision event and initiates said second higher inflation stage only when said severity of said collision event equals or exceeds a second higher threshold value indicative of a severe collision event and when said seat is positioned forward of said predetermined position said controller initiates said first low inflation stage only when said severity of said collision event equals or exceeds one of said first and said second threshold values and prohibits initiation of said second higher inflation stage.

8. The method according to claim 7, wherein when said seat is positioned forward of said predetermined position said controller initiates said first low inflation stage when said severity of said collision event equals or exceeds said first threshold value indicative of said moderate collision event.

9. The method according to claim 7, wherein when said seat is positioned forward of said predetermined position said controller initiates said first low inflation stage when said severity of said collision events equal or exceeds said second threshold value indicative of said severe collision event.

10. The method according to claim 7, wherein said step of sensing said severity of said collision event includes sensing a deceleration of said vehicle.

11. An air bag suppression system in a vehicle comprising:

a supplemental inflatable restraint system including an air bag deployable in a first low inflation stage and a second high inflation stage;

a seat position detecting means for detecting a position of a seat within said vehicle;

a sensing means for sensing a severity of a collision event of said vehicle; and a controller for selectively initiating said first low and said second high inflation stages of said air bag dependent on said seat position detecting means and said sensing means, wherein when said seat position detecting means detects said position of said seat rearward of a predetermined position said controller initiates said first low inflation stage only when said sensing means senses a severity not less than a first threshold value and initiates said second high inflation stage only when said sensing means senses a severity not less than a second threshold value, and when said seat position detecting means detects said position of said seat forward of said predetermined position said controller initiates said first low inflation stage only when said sensing means senses a severity not less than said second threshold value and prohibits initiation of said second high inflation stage.

12. The air bag suppression system according to claim 11, wherein said sensing means comprises a deceleration sensor to sense the deceleration of said vehicle to determine said severity of said collision event.

* * * * *